US012746178B2

(12) United States Patent
Wang

(10) Patent No.: US 12,746,178 B2
(45) Date of Patent: Sep. 29, 2026

(54) MASSAGER

(71) Applicant: Shenzhen Hongsheng Network Technology Co., Ltd, Shenzhen (CN)

(72) Inventor: Weimin Wang, Chongqing (CN)

(73) Assignee: Shenzhen Hongsheng Network Technology Co., Ltd, Shenzhen (CN)

( * ) Notice: Subject to any disclaimer, the term of this patent is extended or adjusted under 35 U.S.C. 154(b) by 556 days.

(21) Appl. No.: 18/447,179

(22) Filed: Aug. 9, 2023

(65) Prior Publication Data

US 2024/0407970 A1 Dec. 12, 2024

(30) Foreign Application Priority Data

Jun. 9, 2023 (CN) ......................... 202321473484.2

(51) Int. Cl.
*A61H 23/02* (2006.01)
*A61H 23/00* (2006.01)
*A61H 19/00* (2006.01)

(52) U.S. Cl.
CPC ............. *A61H 23/02* (2013.01); *A61H 19/32* (2013.01); *A61H 2023/002* (2013.01);
(Continued)

(58) Field of Classification Search
CPC .............. A61H 23/02; A61H 2023/002; A61H 2201/1654; A61H 2201/5071; A61H 2201/5092; A61H 7/005; A61H 7/007; A61H 19/32; A61H 19/30; A61H 19/00; A61H 7/00; A61H 23/00
See application file for complete search history.

(56) References Cited

U.S. PATENT DOCUMENTS 4,627,292 A * 12/1986 Dekrone ............... G01L 13/025 73/728
8,308,631 B2 * 11/2012 Kobashikawa ........ A61H 19/40 600/38
(Continued)

FOREIGN PATENT DOCUMENTS

CN 202537900 U * 10/2012
CN 204972173 U 1/2016
(Continued)

OTHER PUBLICATIONS

English translation for CN 202537900, machine translated by espacenet.com.*

*Primary Examiner* — Tu A Vo
(74) *Attorney, Agent, or Firm* — Nitin Kaushik

(57) ABSTRACT

A massager, including a massage device with a massage chamber that can undergo elastic deformation, and a shell that accommodates and fixes the massage device; further including a deformation support frame and a vibration motor that are respectively compatibly installed in the massage device; The deformation support frame is provided with a first deformation portion that is enlarged forward, and the massage device is provided with a second deformation portion corresponding to the shape of the first deformation portion; A massage reinforcement block protrudes on the side wall of the massage device, and the massage reinforcement block can correspondingly move towards the centerline of the massage chamber as the second deformation portion is stretched backwards and deformed.

7 Claims, 7 Drawing Sheets

(52) U.S. Cl.
CPC ................ *A61H 2201/1654* (2013.01); *A61H 2201/5071* (2013.01); *A61H 2201/5092* (2013.01)

(56) References Cited

U.S. PATENT DOCUMENTS

| | | | | |
|---|---|---|---|---|
| 10,154,832 | B2 * | 12/2018 | Cai | A61H 23/0254 |
| 2003/0036678 | A1 * | 2/2003 | Abbassi | A61H 19/40 340/407.1 |
| 2017/0071819 | A1 * | 3/2017 | Chen | A61H 19/44 |
| 2021/0128400 | A1 * | 5/2021 | Tindal | A61H 19/32 |
| 2021/0196560 | A1 * | 7/2021 | Liu | A61H 9/0092 |
| 2023/0046726 | A1 * | 2/2023 | Liu | A61H 23/02 |
| 2023/0210718 | A1 * | 7/2023 | Zhou | A61H 19/32 600/38 |
| 2023/0372191 | A1 * | 11/2023 | Gu | A61H 9/0078 |
| 2024/0115456 | A1 * | 4/2024 | Chen | A61H 19/32 |

FOREIGN PATENT DOCUMENTS

| | | | | |
|---|---|---|---|---|
| CN | 206974117 | U | 2/2018 | |
| CN | 110960410 | A * | 4/2020 | A61H 19/32 |
| CN | 214968783 | U | 12/2021 | |
| WO | WO-2012101289 | A1 * | 8/2012 | A61H 19/32 |
| WO | WO-2018176210 | A1 * | 10/2018 | A61H 19/00 |

* cited by examiner

MASSAGER

CROSS-REFERENCE TO RELATED APPLICATIONS

The application claims priority to Chinese patent application No. 2023214734842, filed on Jun. 9, 2023, the entire contents of which are incorporated herein by reference.

TECHNICAL FIELD

The present invention relates to the field of massager technology, in particular to an improved massager.

BACKGROUND

As the pace of life speeds up, people feel increasing pressure and often work overtime to complete their tasks. After a day of intense work, people become tired, so they often use a massager to massage parts of the body to alleviate fatigue and maintain physical and mental health.

The Authorized Announcement No. CN216318791U discloses a negative pressure massager, which specifically discloses a massage device with a massage chamber that can undergo elastic deformation and a shell that accommodates and fixes the massage device: The shell is enclosed with the massage device to form an air chamber, and the negative pressure massager also comprises a unidirectional exhaust structure that can connect the air chamber with the outside, wherein, the air chamber is set so that when the massaged area of the human body is inserted into the massage chamber, the air chamber has a tendency to exhaust outward due to volume reduction, and the unidirectional exhaust structure connects the air chamber with the outside under the thrust of the air chamber: When the massaged area of the human body is extracted from the massage chamber, the unidirectional exhaust mechanism blocks external gas from entering the chamber, and the difference in volume generated by the massaged area of the human body being extracted from the massage chamber will be applied to the massage device to cause the massage device to contract and deform, resulting in an adsorption effect on the massaged area of the human body.

Although the above-mentioned negative pressure massager has some advantages, production and development personnel have found after careful research and analysis that it still has some shortcomings. For example, due to the fact that the side wall of the massage chamber of the negative pressure massager is basically flat, its massage effect on the massaged area of the human body is not good enough during the working process, and the user experience still needs to be improved.

SUMMARY

In response to the above problems of the prior art, the purpose of the present invention is to provide an improved massager that uses a massage reinforcement block, which is set on the side wall of the massage chamber and can move towards the centerline of the massage chamber according to the shape changes of the massage device, to compress the massaged area of the human body so as to enhance the massage effect. In addition, this design has good massage effect and good user experience: Meanwhile, it can achieve a vibration effect by setting a vibration motor, thereby further enhancing the massage effect.

In order to achieve the above purpose, the technical solution of the present invention is:

An improved massager, comprising a massage device with a massage chamber that can undergo elastic deformation, and a shell that accommodates and fixes the massage device; further comprising a deformation support frame and a vibration motor that are respectively compatibly installed in the massage device: The deformation support frame is provided with a first deformation portion that is enlarged forward, and the massage device is provided with a second deformation portion corresponding to the shape of the first deformation portion; A massage reinforcement block protrudes on the side wall of the massage device, and the massage reinforcement block can correspondingly move towards the centerline of the massage chamber as the second deformation portion is stretched backwards and deformed.

For the additional structure of the above technical solution, the following options are also included:

Furthermore, it also comprises a vibration adjustment mechanism set in the shell and corresponding to the vibration motor; When the vibration adjustment mechanism senses the corresponding backward stretching deformation or forward restoration of the second deformation portion, the vibration adjustment mechanism correspondingly controls the vibration motor to increase or decrease the vibration intensity.

Furthermore, the vibration adjustment mechanism comprises a fixed inductor and an induction block that is matched with the inductor and connected to the rear end of the massage device.

Furthermore, the induction block passes through a guide rod, a spring, and a slider; The guide rod extends in a forward and backward direction and is fixedly set: The slider, the spring, and the induction block are sequentially connected to the guide rod from front to back, and the slider is connected to the rear end of the massage device: The induction block is cooperatively located in front of the inductor.

Furthermore, the slider is connected to the rear end of the massage device through a positioning plate: The positioning plate is clamped on the rear end of the massage device, and a sliding groove for embedding the slider is provided on the side edge of the positioning plate.

Furthermore, the inductor is a pressure sensor or an infrared sensor.

Furthermore, the vibration adjustment mechanism comprises an electrodeless encoder, a gear, and a rack: The electrodeless encoder is connected to the rear end of the massage device, the gear is connected to the electrodeless encoder, and the rack is extended in forward and backward directions and fixed in the shell and engages with the gear.

Furthermore, it also comprises a guide rod, a spring, and a slider: The guide rod extends in a forward and backward direction and is fixedly set: The slider and the spring are sequentially sleeved on the guide rod from front to back, and the slider is connected to the rear end of the massage device, and the rear end of the spring is fixed.

Furthermore, the first deformation portion comprises two curved plates symmetrically distributed above and below and spread forward, and a positioning ring for connecting the rear ends of the two curved plates.

Furthermore, during the process of the massage reinforcement block moving correspondingly towards the centerline of the massage chamber with the second deformation portion stretching backwards, the vibration motor vibrates and causes the massage device to vibrate.

The beneficial effects of the present invention are:

(1) The present invention sets a vibration motor inside the massage device and a massage reinforcement block on the side wall of the massage chamber. The massage reinforcement block can move towards the centerline direction of the massage chamber correspondingly with the second deformation portion stretching backwards and deforming. Therefore, the vibration of the vibration motor can be combined with the massage reinforcement block to simultaneously vibrate and compress the massaged area of the human body, thereby improving the massage effect, and this design can effectively improve the massage effect and provide a good user experience.

(2) The present invention establishes a vibration adjustment mechanism that cooperates with the vibration motor, so that the vibration intensity of the vibration motor can be enhanced or reduced based on the deformation of the second deformation portion, thereby achieving a good massage effect.

REFERENCE NUMERAL

Figure 1:
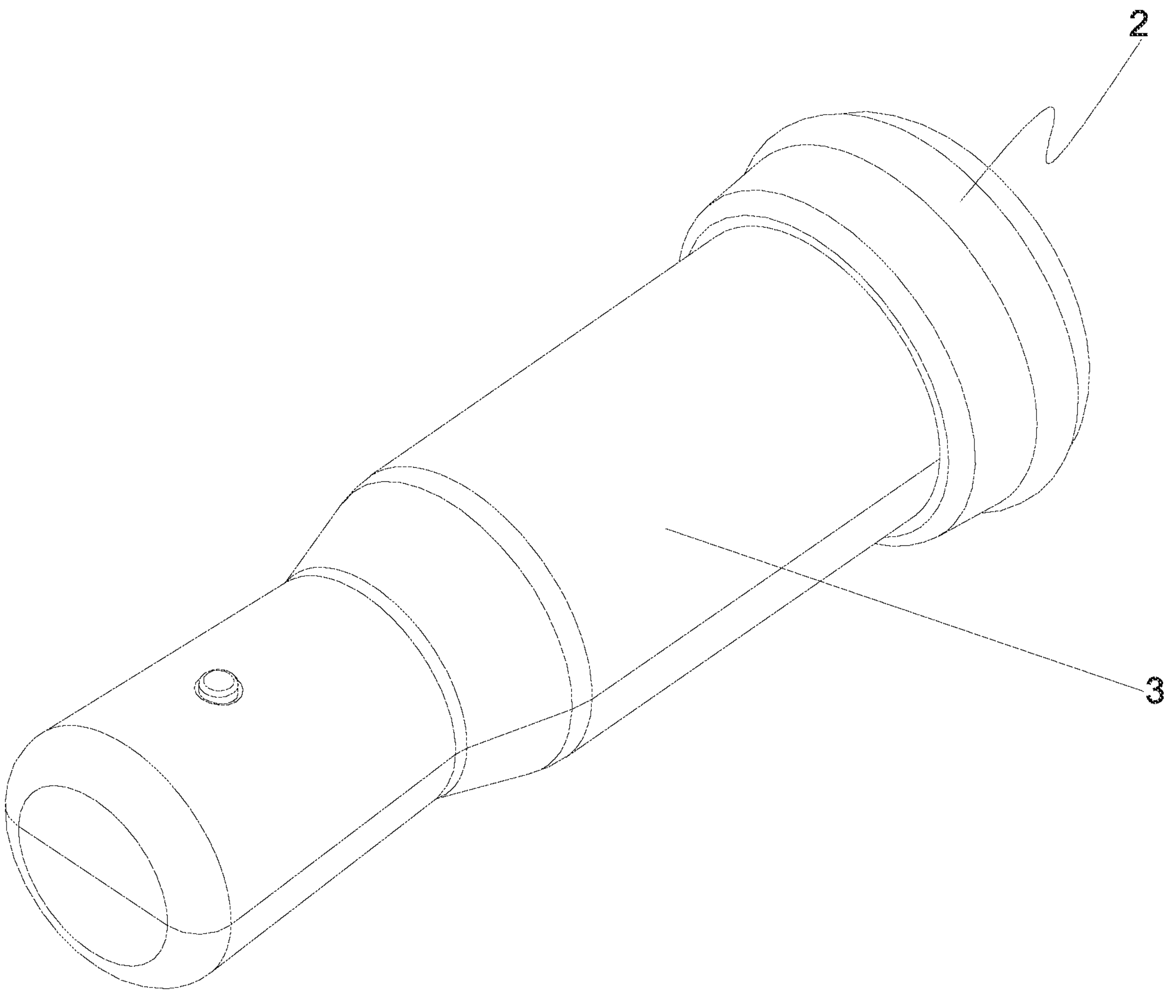
FIG. 1 is an overall structural schematic diagram I of Embodiment 1 of the present invention.
Figure 2:
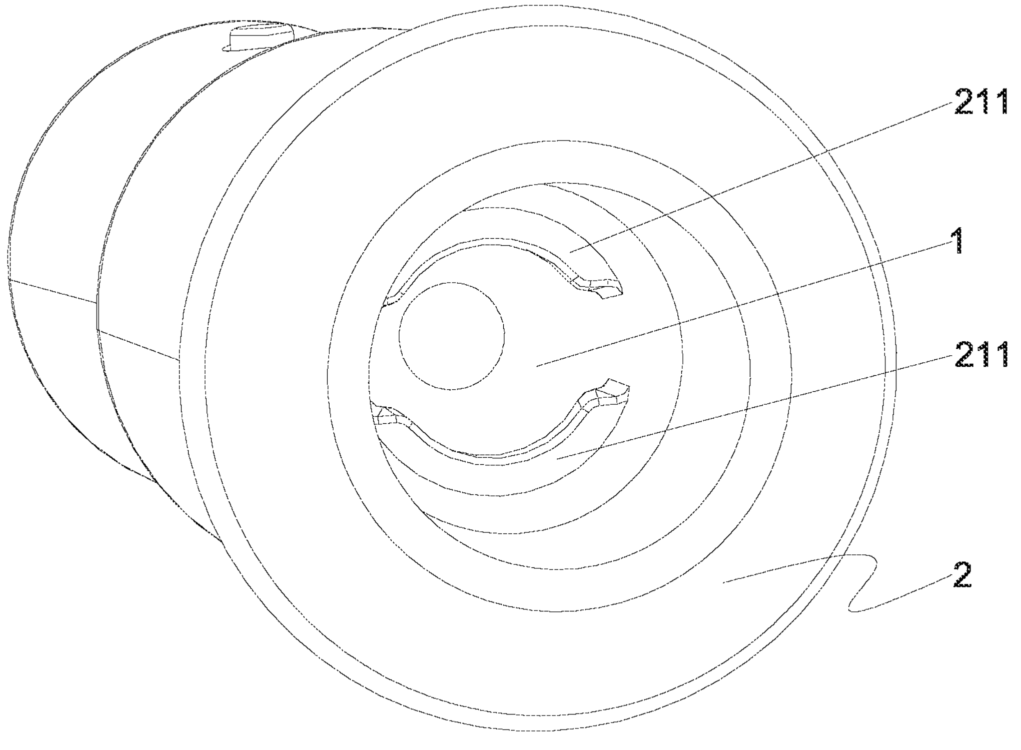
FIG. 2 is an overall structural schematic diagram II of Embodiment 1 of the present invention.

1. Massage chamber; 2. Massage device; 21. Second deformation portion: 211. Massage reinforcement block: 22. Head: 23. Mounting portion: 24. Folded edge: 3. Shell: 4. Deformation support frame: 41. First deformation portion: 411. Curved plate: 412. Positioning ring: 413. Mounting rack: 414. Insert: 5. Vibration motor: 6. Vibration adjustment mechanism: 61. Inductor; 62. Induction block; 63. Guide rod: 64. Spring: 65. Slider: 66. Positioning plate: 67. Sliding groove: 68. Electrodeless encoder: 69. Gear; 70. Rack.

DETAILED DESCRIPTION OF THE EMBODIMENTS

Embodiments in accordance with the present disclosure are described below in conjunction with the individual figures.

Embodiment 1

As shown in FIGS. 1-6, an improved massager comprises a massage device 2 with a massage chamber 1 that can undergo elastic deformation, and a shell 3 that accommodates and fixes the massage device 2; It also comprises a deformation support frame 4 and a vibration motor 5 that are respectively compatibly installed in the massage device 2; The deformation support frame 4 is provided with a first deformation portion 41 that is enlarged forward, and the massage device 2 is provided with a second deformation portion 21 corresponding to the shape of the first deformation portion 41. Specifically, both the first deformation portion 41 and the second deformation portion 21 are similar to a trumpet shape: A massage reinforcement block 211 protrudes on the side wall of massage device 2, and the massage reinforcement block 211 can correspondingly move towards the centerline of massage chamber 1 as the second deformation portion 21 is stretched backwards and deformed. Specifically, in order to facilitate the control of the vibration of the vibration motor 5, one design is that when the massage reinforcement block 211 moves towards the centerline of the massage chamber 1 with the second deformation portion 21 stretching backwards, the vibration motor 5 vibrates and causes the massage device 2 to vibrate. Therefore, when the second deformation portion 21 does not stretch backwards and deform, the vibration motor 5 will not vibrate.

Preferably, the massage reinforcement block 211 is provided with two blocks set symmetrically above and below.

Figure 3:
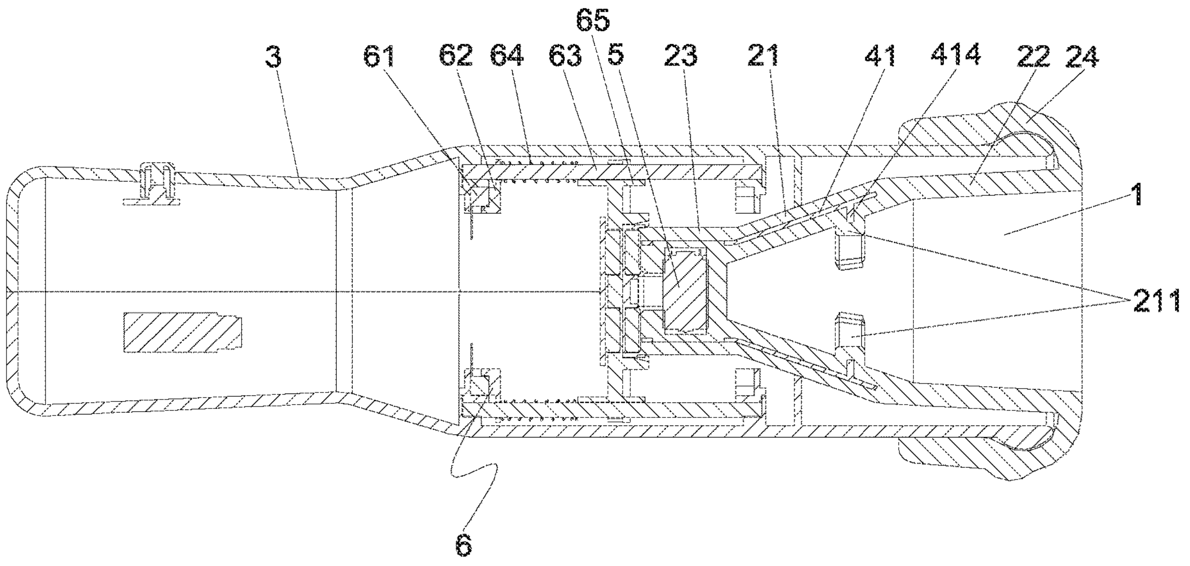
FIG. 3 is a longitudinal section of Embodiment 1 of the present invention.
Figure 4:
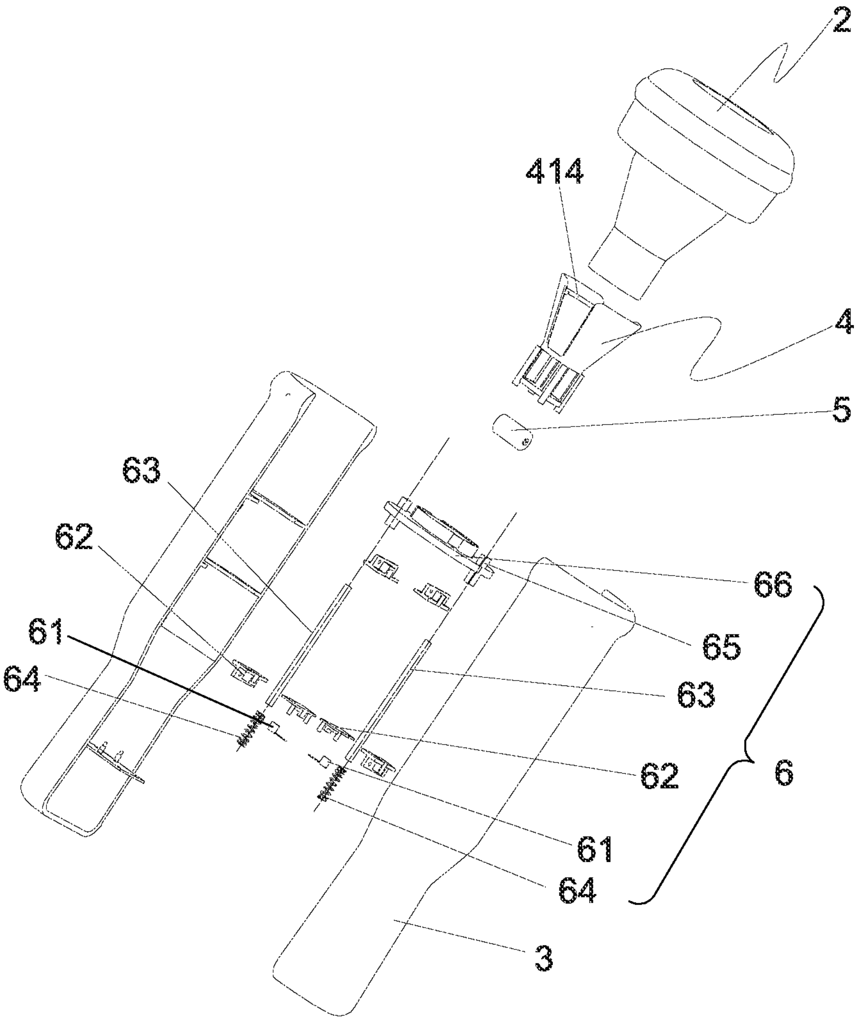
FIG. 4 is an exploded view of Embodiment 1 of the present invention.

As shown in FIG. 3, it also comprises a vibration adjustment mechanism 6 set in the shell 3 and matched with the vibration motor 5: When the vibration adjustment mechanism 6 senses the corresponding backward stretching deformation or forward restoration of the second deformation portion 21, the vibration adjustment mechanism 6 controls the vibration motor 5 to increase or decrease the vibration intensity. In addition, to ensure a user experience, the vibration intensity can be gradually increased or decreased. Therefore, it is clear from the above description that the vibration motor 5 is indirectly controlled by the vibration adjustment mechanism 6 to start and stop, but the person skilled in the art should know that the vibration motor 5 can also be set to vibrate all the time, and then the vibration adjustment mechanism 6 can be used to control the vibration intensity of the vibration motor 5.

As shown in FIGS. 3 to 6, in this embodiment, for how the vibration adjustment mechanism 6 senses the shape change of the second deformation portion 21, it can be achieved through the cooperation between the inductor 61 and the induction block 62. For example, the vibration adjustment mechanism 6 comprises a fixed inductor 61 and an induction block 62 that is connected to the rear end of the massage device 2 and is matched with the inductor 61, Thus, the second deformation portion 21 will move the induction block 62 to make corresponding changes during the shape change process, so that the signal of the change can be sensed by the inductor 61, and these signal changes can be used to control the vibration intensity of the vibration motor 5.

As shown in FIGS. 3 to 6, in this embodiment, in order to improve the deformation stability of the second deformation portion 21 and accurately sense the changes of the induction block 62, the induction block 62 passes through the guide rod 63, spring 64, and slider 65; The guide rod 63 extends along the front and rear directions and is fixedly set; The slider 65, spring 64, and induction block 62 are sequentially connected to the guide rod 63 from front to back, and the slider 65 is connected to the rear end of the massage device 2; The induction block 62 is cooperatively located in front of the inductor 61. After the above settings, when the second deformation portion 21 is deformed, it will drive the slider 65 to perform corresponding actions, and the slider 65 in turn drives the spring 64 to synchronize the motion of the induction block 62, thereby cooperating with the inductor 61 to achieve signal output and change effects. In addition, in order to further improve the stability of deformation and ensure the effectiveness of the use of inductor 61 and induction block 62, inductor 61, induction block 62, guide rod 63, spring 64, and slider 65 can be set as two groups distributed up and down.

Figure 5:
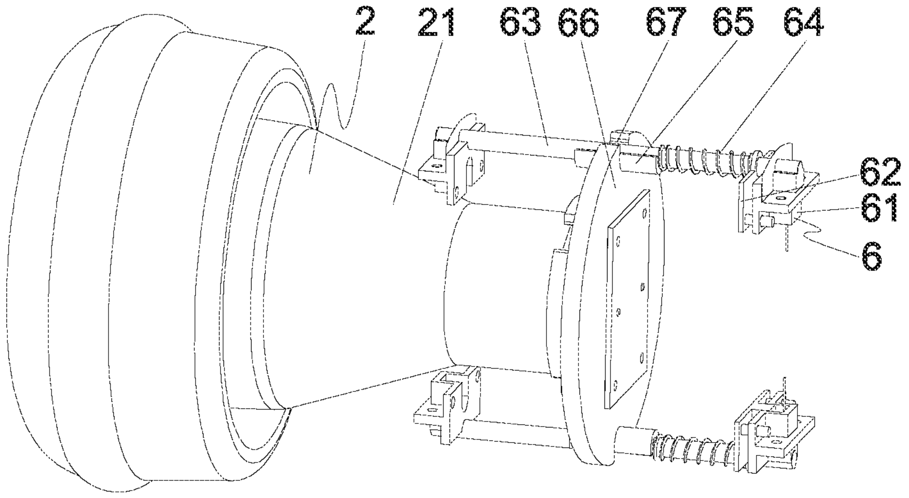
FIG. 5 is a partial structural schematic diagram I of Embodiment 1 of the present invention.

As shown in FIG. 5, the slider 65 is connected to the rear end of the massage device 2 through a positioning plate 66: The positioning plate 66 is clamped on the rear end of the massage device 2, and a sliding groove 67 for embedding the slider 65 is provided on the side of the positioning plate 66. In addition, for the convenience of production, the slider 65 can be integrally formed with the positioning plate 66. Thus, both sliders 65 can be connected to the positioning plate 66, thereby utilizing the deformation of the massage device 2 to drive the positioning plate 66 to achieve displacement, and the positioning plate 66 synchronously drives the movement of the sliders 65.

For ease of use, the inductor 61 can be either a pressure inductor or an infrared inductor. The pressure inductor can be used to sense the magnitude of the pressure applied to the induction block 62 during movement to achieve signal changes. For example, when the pressure on the inductor 61 increases, the vibration intensity of the vibration motor 5 gradually increases, and vice versa, the vibration intensity of the vibration motor 5 gradually decreases: The infrared inductor is used to sense the variation of the distance between the induction block 62 during its movement to achieve signal changes. For example, as the induction block 62 approaches the inductor 61, the vibration intensity of the vibration motor 5 gradually increases, and vice versa, the vibration intensity of the vibration motor 5 gradually decreases. Therefore, both signal changes mentioned above can be used to control the vibration intensity of vibration motor 5.

Figure 6:
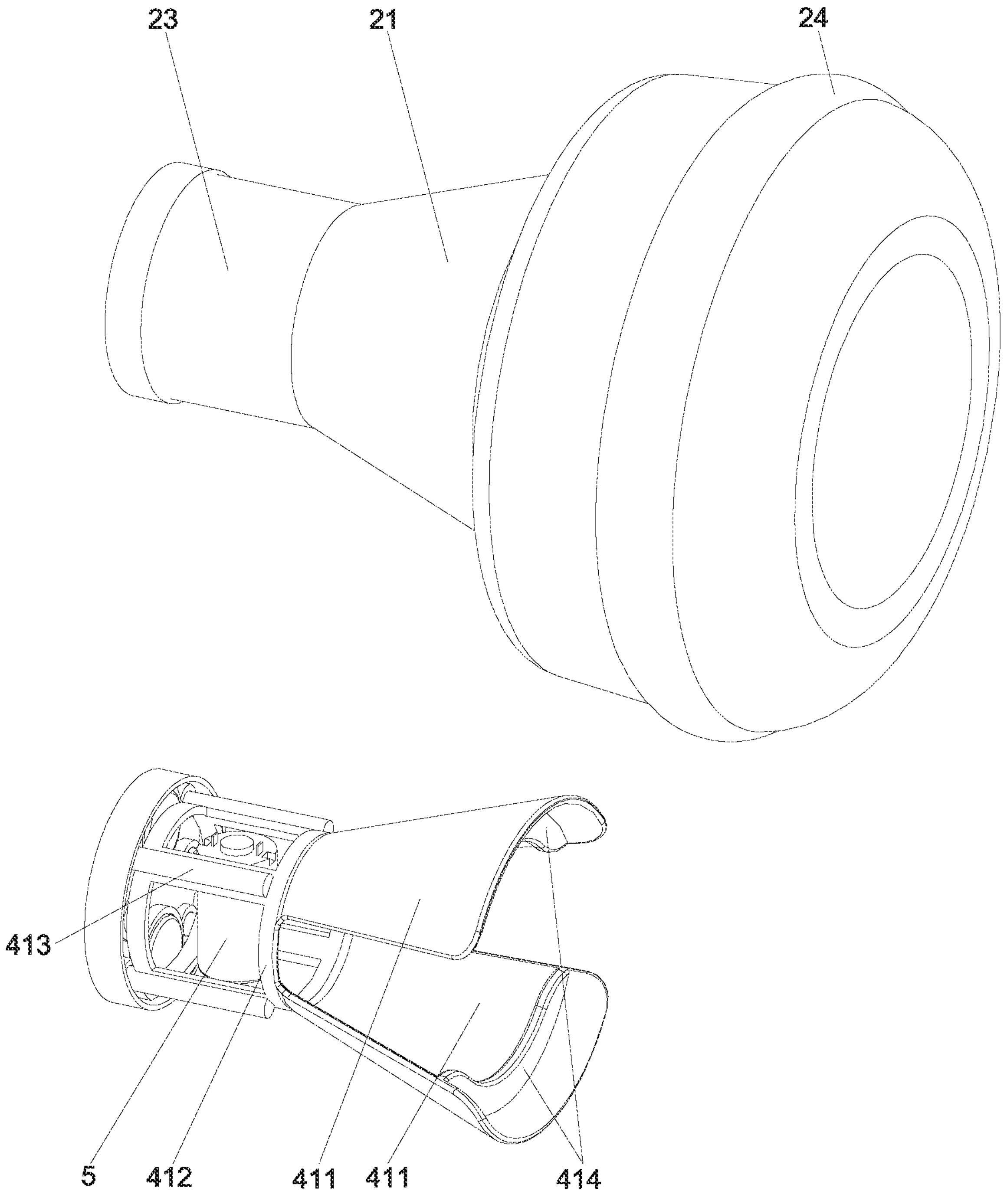
FIG. 6 is a partial structural schematic diagram II of Embodiment 1 of the present invention.

As shown in FIG. 6, the first deformation portion 41 comprises two curved plates 411 symmetrically distributed above and below and spread forward, and a positioning ring 412 for connecting the rear ends of the two curved plates 411. The design of two curved plates 411 can facilitate the first deformation portion 41 to achieve the action of closing and opening.

As shown in FIGS. 3 to 6, the massage device 2 comprises a head 22, a second deformation portion 21, and a mounting portion 23 that are sequentially connected from front to back, so that the second deformation portion will synchronously drive the mounting portion 23 to move when it is deformed; The first deformation portion 41 is compatibly installed in the second deformation portion 21, while the vibration motor 5 is correspondingly installed in the installation portion 23. Deservedly, in order to support the mounting portion 23, the deformation support frame 4 also comprises a mounting rack 413 connected to the rear end of the positioning ring 412 and matched with the mounting portion 23, and the vibration motor 5 is placed in the mounting rack 413.

As shown in FIGS. 3 and 6, in order to facilitate the installation of massage device 2 on the shell 3 and improve the stability of massage device 2, a folded edge 24 for covering the shell 3 is also provided around the head 22.

As shown in FIG. 3, in order to allow the massage reinforcement block 211 to move more smoothly towards the centerline of the massage chamber 1, a corresponding insert 414 inserted into the curved plate 411 is provided on the inner wall of the first deformation portion 41, which can be used to push the massage reinforcement block 211 to move and improve the stiffness and stability of the massage reinforcement block 211, thereby ensuring the massage effect.

Deservedly, there will also be a circuit board as the control center and a battery for providing power inside the shell 3, and there will be switch buttons for controlling the massager switch on the outer wall of the shell 3. As the above settings are all prior art, they will not be specifically described here.

As shown in FIG. 3, in this embodiment, the vibration motor 5 is first activated during use, but at the beginning, the vibration motor 5 is not vibrating. After the massaged area of the human body is inserted into the massage chamber 1, the massaged area of the human body moves back until it presses against the end of the massage chamber 1. Then, when further pushed back, the second deformation portion 21 is pulled back to stretch and deform. Due to the gradual elongation of the overall length of massage device 2, two curved plates 411 and two massage reinforcement blocks 211 will gradually move towards the centerline of massage chamber 1, which means they will slowly move closer to each other. This allows the massage reinforcement blocks 211 to gradually compress the massaged area of the human body, so as to greatly enhance the massage effect. In addition, due to the second deformation portion 21 stretching backwards and deforming, the positioning plate 66 drives the slider 65 to move backwards, causing the spring 64 to push the induction block 62 towards the direction of the inductor 61. When the inductor 61 senses that the induction block 62 is gradually approaching, the vibration motor 5 will be controlled by the control center to start shaking and the vibration intensity will gradually increase. Similarly, when the massaged area of the human body moves outward, the second deformation portion 21 gradually loses external force, which means that the second deformation portion 21 will gradually return to its original state forward, and when the inductor 61 senses that the induction block 62 is gradually moving away, the vibration intensity of the vibration motor 5 will be gradually reduced through the control center. At this time, the curved plate 411 and massage reinforcement block 211 will also gradually open, thereby reducing compression on the massaged area of the human body. When the deformation support frame 4 and massage device 2 are restored to their original state, the vibration motor 5 stops vibrating. Finally, repeat the above steps.

As a consequence, the description of the above usage method indicates that a good massage effect can be achieved by the entry and exit of the massaged area of the human body in the massage chamber 1. For example, the massage reinforcement block 211 can compress the massaged area of the human body to enhance the massage effect. Then, combined with the control method of increasing or decreasing the vibration intensity of the vibration motor 5, the massager can achieve a good massage effect on the massaged area of the human body, and the use effect is good.

The massaged area of the human body can be fingers, but not limited to fingers. It can also be other areas of the human body that need to be massaged, and there is no specific limit here.

Embodiment 2

Figure 7:
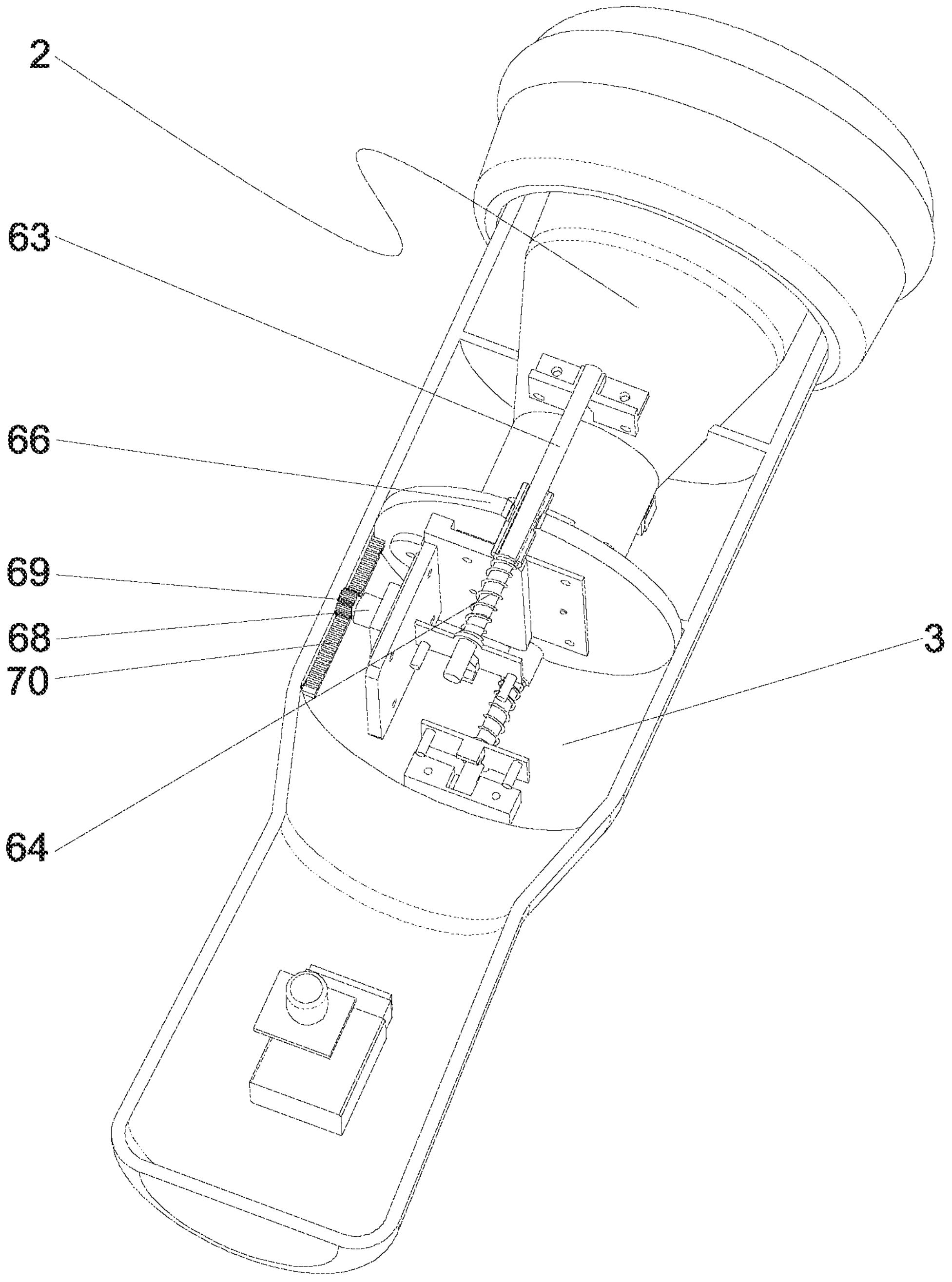
FIG. 7 is an internal structure diagram of Embodiment 2 of the present invention.

As shown in FIG. 7, the difference between this embodiment and embodiment 1 is that in this embodiment, the vibration adjustment mechanism 6 comprises an electrodeless encoder 68, a gear 69, and a rack 70, which means it does not use the combination of inductor 1 and induction block 2; The electrodeless encoder 68 is connected to the rear end of the massage device 2, the gear 69 is connected to the electrodeless encoder 68, and the rack 70 is extended in forward and backward directions and fixed in the shell 3 and engages with the gear 69. Specifically, the electrodeless encoder 68 is connected to the mounting portion 23.

In this embodiment, similarly, in order to improve the deformation stability of the second deformation portion 21, it also comprises a guide rod 63, a spring 64, and a slider 65; The guide rod 63 extends along the front and rear directions and is fixedly set: The slider 65 and spring 64 are sequentially sleeved on the guide rod 63 from front to back. The slider 65 is connected to the rear end of the massage device 2 and the rear end of the spring 64 is fixedly set, so that the spring 64 can be used to assist in the reset of the massage device 2. Since its usage is similar to that in Embodiment 1, it will not be further elaborated herein.

Deservedly, both the slider 65 and the electrodeless encoder 68 can be connected to the massage device 2 through a positioning plate 66. The guide rod 63, spring 64, and slider 65 can also be set in two separate groups, which will not be described here.

In this embodiment, when the massaged area of the human body is moved backwards and the second deformation portion 21 is pulled backwards to stretch and deform, the electrodeless encoder 68 and gear 69 are synchronously driven to move backwards, and the gear 69 will rotate on the rack 70. When the electrodeless encoder 68 senses that the distance for gear 69 to rotate backwards is increasing, the vibration motor 5 is controlled by the control center to vibrate and the vibration intensity gradually increases; Similarly, when the massaged area of the human body is moved outwards, that is, when the second deformation portion 21 gradually returns to its original state forward, the electrodeless encoder 68 senses that the forward rotation distance of the gear 69 is getting longer and longer, the vibration motor 5 is controlled by the control center to vibrate and the vibration intensity gradually decreases; When the deformation support frame 4 and the massage device 2 are restored to their original state, the vibration motor 5 stops vibrating.

The scope of the present disclosure is not defined by the embodiments described above, but by the appended claims and their equivalent scope.

What is claimed is:

1. A massager, comprising a massage device with a massage chamber that is configured to undergo elastic deformation, and a shell that accommodates and fixes the massage device; comprising a deformation support frame and a vibration motor that are respectively compatibly installed in the massage device; the deformation support frame is provided with a first deformation portion that is enlarged forward, and the massage device is provided with a second deformation portion corresponding to a shape of the first deformation portion; a massage reinforcement block protrudes on a side wall of the massage device, and the massage reinforcement block is configured to correspondingly move towards the centerline of the massage chamber as the second deformation portion is stretched backwards and deformed;

the massager also comprises a vibration adjustment mechanism set in the shell and corresponding to the vibration motor; when the vibration adjustment mechanism senses the corresponding backward stretching deformation or forward restoration of the second deformation portion, the vibration adjustment mechanism correspondingly controls the vibration motor to increase or decrease a vibration intensity; the vibration adjustment mechanism comprises an electrodeless encoder, a gear, and a rack; the electrodeless encoder is connected to a rear end of the massage device, the gear is connected to the electrodeless encoder, and the rack is extended in forward and backward directions and fixed in the shell and engages with the gear.

2. The massager of claim 1, wherein: the massager also comprises a guide rod, a spring, and a slider; the guide rod extends in a forward and backward direction and is fixedly set in the shell; the slider and the spring are sequentially sleeved on the guide rod from front to back, and the slider is connected to the rear end of the massage device and the rear end of the spring is fixed.

3. The massager of claim 1, wherein: the first deformation portion comprises two curved plates symmetrically distributed above and below and spread forward, and a positioning ring for connecting rear ends of the two curved plates.

4. The massager of claim 1, wherein: when the massage reinforcement block moving correspondingly towards the centerline of the massage chamber with the second deformation portion stretching backwards, the vibration motor vibrates and causes the massage device to vibrate.

5. A massager, comprising a massage device with a massage chamber that is configured to undergo elastic deformation, and a shell that accommodates and fixes the massage device; comprising a deformation support frame and a vibration motor that are respectively compatibly installed in the massage device; the deformation support frame is provided with a first deformation portion that is enlarged forward, and the massage device is provided with a second deformation portion corresponding to a shape of the first deformation portion; a massage reinforcement block protrudes on a side wall of the massage device, and the massage reinforcement block is configured to correspondingly move towards the centerline of the massage chamber as the second deformation portion is stretched backwards and deformed; the massager also comprises a vibration adjustment mechanism set in the shell and corresponding to the vibration motor; when the vibration adjustment mechanism senses the corresponding backward stretching deformation or forward restoration of the second deformation portion, the vibration adjustment mechanism correspondingly controls the vibration motor to increase or decrease a vibration intensity; the vibration adjustment mechanism comprises a fixed inductor and an induction block that is matched with the fixed inductor and connected to a rear end of the massage device;

a guide rod passes through the induction block, a spring, and a slider;

the guide rod extends in a forward and backward direction and is fixedly set in the shell; the slider, the spring, and the induction block are sequentially connected to the guide rod from front to back, and the slider is connected to the rear end of the massage device; the induction block is cooperatively located in front of the fixed inductor.

6. The massager in claim 5, wherein: the fixed inductor is a pressure inductor or an infrared inductor.

7. A massager, comprising a massage device with a massage chamber that is configured to undergo elastic deformation, and a shell that accommodates and fixes the massage device; comprising a deformation support frame and a vibration motor that are respectively compatibly installed in the massage device;

the deformation support frame is provided with a first deformation portion that is enlarged forward, and the massage device is provided with a second deformation portion corresponding to a shape of the first deformation portion;

a massage reinforcement block protrudes on a side wall of the massage device, and the massage reinforcement block is configured to correspondingly move towards the centerline of the massage chamber as the second deformation portion is stretched backwards and deformed; the massager also comprises a vibration adjustment mechanism set in the shell and corresponding to the vibration motor; when the vibration adjustment mechanism senses the corresponding backward stretching deformation or forward restoration of the second deformation portion, the vibration adjustment mechanism correspondingly controls the vibration motor to increase or decrease a vibration intensity; the vibration adjustment mechanism comprises a fixed inductor and an induction block that is matched with the fixed inductor and connected to a rear end of the massage device; a guide rod passes through the induction block, a spring, and a slider; the guide rod extends in a forward and backward direction and is fixedly set in the shell; the slider, the spring, and the induction block are sequentially connected to the guide rod from front to back, and the slider is connected to the rear end of the massage device; the induction block is cooperatively located in front of the fixed inductor;

the slider is connected to the rear end of the massage device through a positioning plate; the positioning plate is clamped on the rear end and a sliding groove for embedding the slider is provided on a side edge of the positioning plate.

* * * * *